United States Patent [19]

Damgaard-Iversen et al.

[11] 3,828,837
[45] Aug. 13, 1974

[54] APPARATUS FOR EVAPORATING LIQUID FROM A SOLUTION OR SUSPENSION

[75] Inventors: Jorgen Damgaard-Iversen, Birkerod; Ove Emil Hansen, Li Vaerlose; Bjorn Lund, Frederiksberg, all of Denmark

[73] Assignee: Aktieselskabet Niro Atomizer, Soborg, Denmark

[22] Filed: Sept. 11, 1972

[21] Appl. No.: 287,867

[30] Foreign Application Priority Data
Sept. 10, 1971 Denmark .......................... 4465/71

[52] U.S. Cl. .............. 159/4 R, 159/4 A, 159/4 CC, 159/4 S, 159/13 B
[51] Int. Cl. ............................................. B01d 1/16
[58] Field of Search .......... 159/4 A, 4 MS, 4 E, 4 S, 159/4 B, 13 B

[56] References Cited
UNITED STATES PATENTS

| | | | |
|---|---|---|---|
| 1,829,477 | 10/1931 | Douthitt............................. | 159/4 K |
| 1,877,648 | 9/1932 | Douthitt........................... | 159/4 MS |
| 1,933,254 | 10/1933 | Goodell .................................. | 23/48 |
| 1,989,406 | 1/1935 | Doolittle............................. | 159/4 A |
| 2,303,811 | 12/1942 | Badenhausen...................... | 23/262 |
| 2,559,989 | 7/1951 | Nyrop ................................. | 159/4 B |
| 2,590,905 | 4/1952 | Tomlinson et al.................. | 159/4 A |
| 2,879,838 | 3/1959 | Flynt et al........................... | 159/4 A |
| 3,151,984 | 10/1964 | Peebles et al....................... | 159/4 S |
| 3,153,609 | 10/1964 | Markant et al. ..................... | 162/36 |
| 3,212,235 | 10/1965 | Markant ......................... | 159/4 A X |

Primary Examiner—Jack Sofer
Attorney, Agent, or Firm—Dennison, Dennison, Townshend & Meserole

[57] ABSTRACT

The present invention relates to evaporation of liquid from a solution or suspension in general and in particular to spray drying or spray concentrating. In such processes suspension or solution is sprayed into an evaporating or drying chamber to which heated drying gas is currently supplied, warm gas phase being simultaneously discharged from the evaporating or drying chamber through one or more discharge conduits or tubes. According to the invention solution or suspension is sprayed into at least one of the discharge tubes, for example by means of spraying or atomizing nozzles, liquid phase is separated from gas phase downstream of these nozzles, for example by means of cyclones, and the said solution or liquid being sprayed into the evaporating or drying chamber is the preconcentrated separated liquid phase. Thereby a two-step evaporation may be obtained by the use of a single evaporating or drying chamber.

9 Claims, 2 Drawing Figures ated with a corresponding heat-economy.

APPARATUS FOR EVAPORATING LIQUID FROM A SOLUTION OR SUSPENSION

BACKGROUND OF THE INVENTION

1. Field of the Invention

The present invention relates to a method in evaporating liquid from a solution or suspension. After evaporation the residue may remain in liquid form or consist of a substantially dry substance. Thus, the present invention comprises as well so-called "spray concentrating" as so-called "spray drying."

2. Description of the Prior Art

It is known (for example from U. S. Pat. No. 1,758,745) to spray dry solutions or suspensions, the solutions or suspensions being spray concentrated in an evaporating chamber, whereafter the concentrated liquid is spray dried in another evaporating chamber or drying chamber. The heated drying gas used in the known evaporating process is counter-currently fed to the drying chamber in which the final spray drying is taking place and thereafter to the evaporating chamber in which the solution or suspension is being spray concentrated.

SUMMARY OF THE INVENTION

The method according to the invention comprises passing warm gas from an evaporting chamber through at least one discharge tube or conduit communicating with said chamber, spraying at least part of the solution or suspension into said discharge tube, separating liquid phase from gas phase in said discharge tube at a position downstream of the spraying of solution or suspension thereinto, spraying at least part of said separated liquid phase into said evaporating chamber, and simultaneously introducing heated gas into said evaporating chamber. According to the invention the warm discharge gas flowing from the evaporating chamber is being used for preconcentrating the suspension or solution before the same is sprayed into the evaporating chamber. Thereby a two-step evaporating process may be obtained by using a relatively simple apparatus or system comprising only a single evaporating chamber and with retention of a rather good heat economy.

The invention also relates to an apparatus or system for use in evaporating liquid from a solution or suspension, said apparatus comprising an evaporating chamber communicating with an inlet conduit for heated gas and with at least one discharge tube or conduit for gas phase, liquid spraying means for spraying a suspension or solution supplied from a first liquid reservoir into the evaporating chamber, further liquid spraying means arranged in said discharge tube and connected to a second liquid reservoir from which suspension or solution may be supplied to said further liquid spraying means, and liquid separating means connected to said discharge tube downstream of said further liquid spraying means and adapted to separate remaining liquid phase from gas phase and to direct the separated liquid phase to said first reservoir. It is appreciated that by means of the apparatus according to the invention it is possible to spray dry or to spray concentrate a solution or suspension in two steps by using the counter-current principle even though the apparatus comprises only a single evaporating chamber. Thus, the aparatus or system according to the invention is substantially more simple and economical than the known two-step apparatuses having a corresponding heat-economy.

BRIEF DESCRIPTION OF THE DRAWING

The invention will now be described more in detail with a reference to the accompanying drawings, wherein FIG. 1 diagrammatically shows an embodiment of the apparatus or system according to the invention adapted for spray concentrating, and FIG. 2 diagrammatically shows a modified embodiment adapted for spray drying.

DESCRIPTION OF THE PREFERRED EMBODIMENTS

Figure 1:
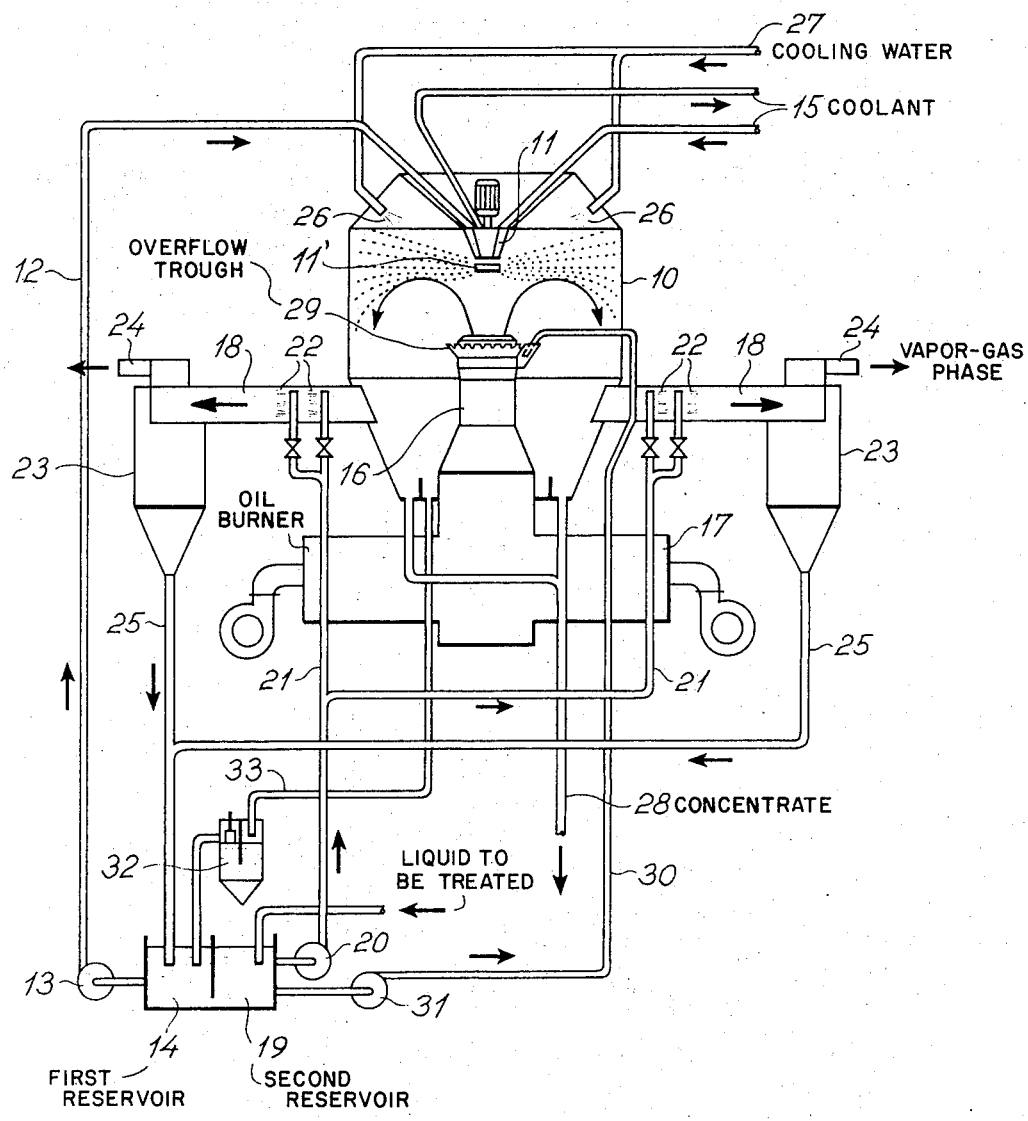

The evaporating apparatus or system shown in FIG. 1 is a so-called spray concentrating system comprising an evaporating chamber 10, preferably made from metal sheet such as of stainless steel. A spraying device 11, which is preferably of the type comprising an atomizing rotating disc, is arranged centrally in the upper part of the evaporating chamber, and is connected to a first reservoir 14 for solution or suspension to be concentrated by means of a conduit 12 including a pump 13. The spraying device 11 is also connected to cooling water conduits 15 by means of which cooling water may be circulated through the spraying or atomizing device. The bottom part of the evaporating chamber is funnel-shaped, and an inlet tube 16 for combustion gas opens centrally into the evaporating chamber and is axially directed towards the rotating disc 11. The tube 16 may form the combustion gas discharging tube of an oil burner 17. The apparatus or system shown in FIG. 1 further comprises a pair of outlet conduits or tubes 18 through which gas phase may be evacuated from the chamber 10 by means of a blower or another pumping device, not shown.

The apparatus or system shown in FIG. 1 comprises a further liquid reservoir 19 from which suspension or solution may be pumped through conduits 21 by means of a pump 20 to liquid atomizing or spraying devices 22 which are preferably atomizing or spraying nozzles. Each outlet tube 18 opens into a cyclone 23 or another device being able to separate gas phase and liquid phase from each other, and each of these cyclones are connected to a conduit 24 for conducting the gas phase away and to a conduit 25 for conducting the separated liquid phase into the liquid reservoir 14. Spraying nozzles 26 are arranged within the upper part of the evaporating chamber 10 and via conduits 27 connected to a pump and a reservoir for cooling water not shown. These nozzles 26 are adapted to spray the inner wall of the evaporating chamber with cooling water in case supply of atomized solution or suspension from the spraying device 11 should be interrupted or fail.

For some applications of the apparatus or system it may be advantageous to provide the combustion gas tube 16 with a trough-shaped collar 29 surrounding the upper part of the tube 16. Liquid may be pumped from the reservoir 19 to the trough 29 via a conduit 30 by means of a pump 31 at a controlled rate which may be checked by means of an indicating device 32 arranged in a drainage conduit 33.

The apparatus or system shown in FIG. 1 functions as follows:

The suspension or solution to be treated is placed in the reservoir 19, and the reservoir 14 contains a suspension or solution which, as explained in the following, has already been preconcentrated by evaporation of liquid. The pump 13 pumps preconcentrated solution or suspension from the reservoir 14 through the conduit 12 to the spraying device 11 which — as indicated on the drawing — imparts a direction of movement with a substantial radial component to the atomized or sprayed liquid so that part thereof impinges the cylindrical side wall of the evaporating chamber and poors down along the same as a liquid film which is continuously being renewed. The oil burner 17 is operating, and the warm combustion gas being generated flows directly into the chamber 10 through the combustion gas tube 16 as an axial flow directed towards the atomizing rotating disc 11. Gas phase is simultaneously evacuated from the evaporating chamber 10 through the outlet tubes 18. The tubes 18 open into the chamber 10 at a level which as shown in FIG. 1 is substantially lower than that of the spraying device 11, and therefore the flow of combustion gas will be sucked back towards the lower part of the chamber in a fountain-like manner as indicated with arrows in FIG. 1 whereby an excellent contact between the warm combustion gas and the liquid particles is obtained without contacting the combustion gas and the side walls of the evaporating chamber 10 before the gas has been suitably cooled by evaporation of liquid particles.

Non-concentrated suspension or solution is by means of the pump 20 pumped from the liquid reservoir 19 through the conduits 21 to the nozzles 22 arranged within the outlet tubes 18. Due to the intimate contact which is thereby obtained between the atomized or sprayed non-concentrated solution or suspension and the still warm gas phase flowing out from the evaporating chamber 10, part of the liquid will be transformed into vapour form and be discharged together with the other gas phase through the conduits 24. The remaining and now more concentrated part of the suspension or solution is being separated by the cyclones 23 and conducted to the reservoir 14 through the conduit 25. As described above the preconcentrated suspension or solution may then be pumped from the reservoir 14 to the atomizing or spraying device 11 and in atomized or sprayed form be introduced into the evaporating chamber 10 where the final concentrating is taking place.

The pump 31 may supply a continuous flow of liquid from the reservoir 19 through the conduit 30 to the trough 29 at a controlled rate. Liquid flowing over the upper edge of the trough-forming collar 29 forms a continuous liquid film pouring down along the outer side of the combustion gas tube 16 and protects the same against excessive heating and depositing of solid matters from the solution or suspension. Excessive non-evaporated liquid from the trough 29 is drained from the lower part of the evaporating chamber 10 through the drainage conduit 33. The liquid drained off from the evaporating chamber 10 is conducted to the reservoir 14 through the indicating device 32 which is adapted to indicate to the operator of the apparatus or system whether the flow rate of liquid through the drainage conduit 33 is suitable.

It is to be understood that in the apparatus or system shown on the drawings the spray concentration or evaporation is performed as a two-step process using the counter-current principle, the first evaporation step taking place within the outlet tubes 18, and the second and final evaporation step taking place within the evaporation chamber 10. The final, concentrated liquid product may continuously flow out from the evaporating chamber 10 through an outlet tube 28. By means of a cooling medium being circulated through the conduits 15 the atomizing or spraying device 11 may be maintained at a suitable temperature. It should be noted that, if desired, an amount of solution or suspension may currently or at certain time intervals be transferred directly from one of the liquid reservoirs 14 and 19 to the other whereby part of the solution or suspension may be recirculated in the apparatus or system, if necessary, or part of the solution or suspension may be withdrawn from treatment in the first step.

Figure 2:
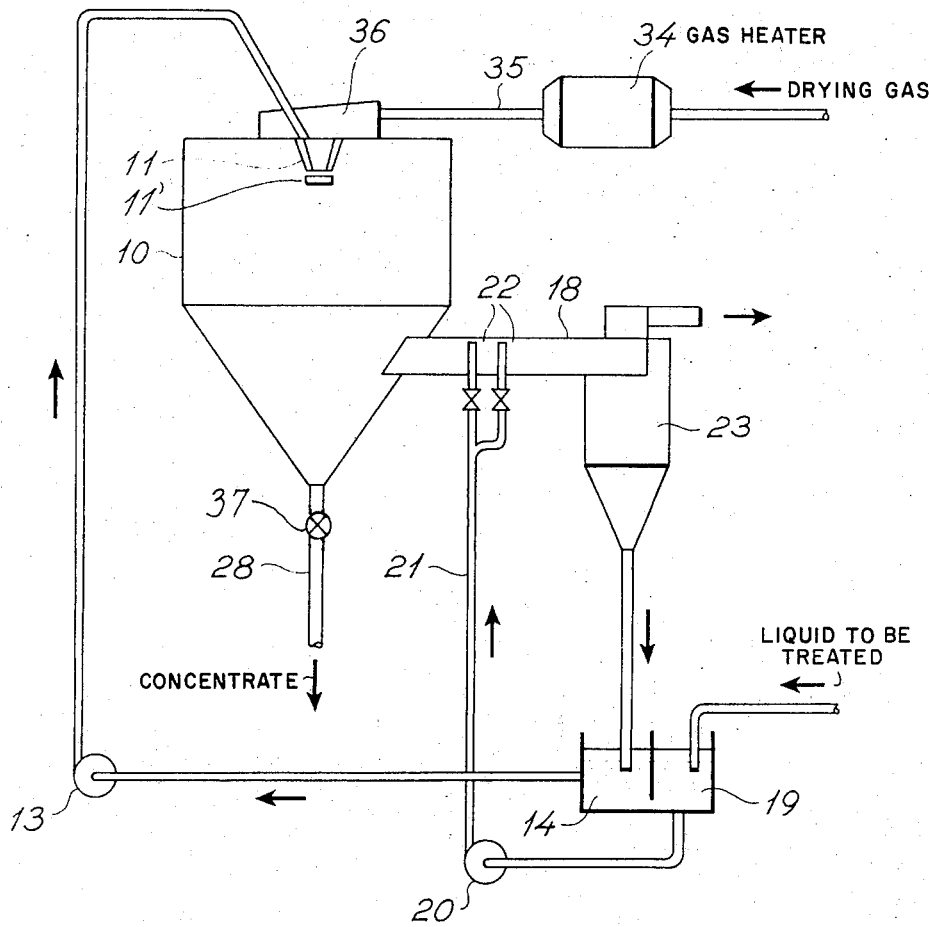

FIG. 2 shows a modified embodiment of the apparatus or system according to the invention. The oil burner 17 and the combustion gas inlet tube 16 have been replaced by a gas heater 34 which may supply heated drying gas through a conduit 35 to a gas distributing device 36 arranged at the top of the evaporating chamber 10. Apart therefrom the structure and function of the apparatus shown in FIG. 2 is similar to that of the apparatus shown in FIG. 1.

EXAMPLE 1

In a spray concentrating system of the type shown in FIG. 1 the cylindrical part of the evaporating chamber 10 had a height of 275 cm and a diameter of 640 cm. The combustion gas inlet tube 16 had a diameter of 150 cm, the outlet tubes 18 were arranged immediately below the cylindrical part of the evaporating chamber, and the axial spacing between the upper part of the openings of these tubes and the rotating disc of the atomizing or spraying device 11 was 250 cm.

40,000 kilograms/hour of an aqueous solution of a nitrophosphate fertilizer were supplied to the evaporating chamber, and combustion gas generated by the combustion of 1,400 kilograms/hour of a furnace oil was used as drying gas. The temperature of the drying gas was 1,600° C.

The starting material which had a water contents of 65 percent by weight and a temperature of 20° C was supplied to the reservoir 19 from which is was pumped to the nozzles 22 and sprayed into the outlet tubes 18 where the gas temperature upstream to the nozzles was 130° C. The gas phase which was evacuated through the conduits 24 from the cyclones 23 amounted to 68,000 cubic metres/hour and had a temperature of 85° C.

20,000 kilograms/hour of concentrate at a temperature of 85° C was discharged through the outlet conduit 28.

EXAMPLE 2.

An apparatus or system of the type shown in FIG. 2 was used for drying a suspension of sodium sulphate.

9,000 kilograms/hour of an aqueous suspension of sodium sulphate containing 44 percent by weight of solids and having a temperature of 40° C was supplied to the reservoir 19. Substantially all of the said suspension was supplied to the nozzles 22 through the conduits 21 by means of a pump 20 and was sprayed into the outlet tube 18 for drying gas, whereby the suspension being separated in the cyclone 23 was concentrated so as to contain solids amounting to 52 percent by weight.

The preconcentrated suspension was collected in the reservoir 14 and therefrom supplied to the spraying or atomizing device 11 by means of the pump 13 and atomized in the evaporating chamber 10 by means of the rotating disc of said spraying device. The volume of the evaporating chamber was 170 cubic metres.

35,750 kilograms/hour of drying gas were supplied from the gas heating device 34 through the conduit 35 to the gas distributing device 36. The inlet temperature of the drying gas was 470° C, and the drying gas was discharged from the evaporating chamber through the outlet tube 18 at a temperature of 170° C.

4,000 kilograms/hour of powdered sodium sulphate having a water contents of 0 percent (bone dry) was taken out from the bottom of the evaporating chamber.

When comparing the process described above with the conventional spray during process by which the same product is prepared without any preconcentrating step, but otherwise under the same conditions, it may be calculated by commonly known formulae that the method according to the invention gives rise to a saving in heat economy of about 25 percent, and a saving in the necessary evaporating chamber volume of also about 25 percent. Furthermore, by using the method described above it is possible to obtain a substantially more effective dust separation from the gas phase being discharged from the evaporating chamber compared to that of conventional spray drying systems by which the dust is separated from the discharge gas in a dry cyclone. By the method according to the invention such an amount of liquid may be sprayed into the discharge gas that the inner wall of the cyclone arranged at a downstream position is being wetted which of course contributes to an especially effective separation of dust.

It should be understood that the method and apparatus according to the invention may not only be used for concentrating or drying of suspensions and solutions, but also mixtures thereof, i.e., liquid substances of any kind containing solids. It should also be noted that any type of warm drying gas may be used in connection with the present invention, and that the shape and type of the evaporating chamber may depart substantially from what is shown in the drawings and described above.

Ww claim:

1. An apparatus for evaporating liquid from a solution or suspension, said apparatus comprising:
    a single vertically disposed evaporating chamber in which liquid and drying media are introduced axially into the upper chamber thereof;
    an inlet tube in communication with said chamber for discharging drying gas to said chamber;
    at least one discharge tube in communication with said chamber for evacuating gas phase therefrom, said discharge tube having an elongated tube portion;
    a first liquid reservoir;
    first spraying means in communication with said first liquid reservoir and said evaporating chamber for spraying solution or suspension from said first liquid reservoir into said evaporating chamber;
    second spraying means;
    a second liquid reservoir for supplying suspension or solution to said second spraying means, said second liquid spraying means in communication with said second liquid reservoir and disposed within said discharge tube portion;
    and liquid separating means connected to said discharge tube downstream of said second liquid spraying means;
    said liquid separating means comprising means to separate remaining liquid phase from gas phase and further comprising means to pass separated liquid phase solely and directly from said discharge tube back into said first reservoir.

2. An apparatus or system according to claim 1, wherein said further liquid spraying means comprises atomizing nozzles.

3. An apparatus or system according to claim 1, wherein said liquid separating means comprises a cyclone.

4. The apparatus of claim 1 wherein said first liquid spraying means comprises a rotating disc.

5. The apparatus of claim 1 wherein said first liquid spraying means is in communication with said evaporating chamber in an upper portion thereof whereby liquid from the first said liquid reservoir is downwardly directed and wherein said inlet tube is in communication with said evaporating chamber at the lower portion thereof for discharging gas thereinto in an upward direction and wherein said discharge tube is in communication with said evaporating chamber at a level thereof lower than said first liquid spraying means.

6. The apparatus as in claim 1 wherein said first liquid reservoir supplies preconcentrated suspension or solution to said first liquid spraying means.

7. The apparatus as in claim 1 wherein said second liquid reservoir supplies a nonconcentrated suspension or solution to said second liquid spraying means.

8. The apparatus as in claim 1 and further including liquid inlet means in communication with said second reservoir and said evaporating chamber for wetting the exterior wall of said inlet tube.

9. The apparatus as in claim 1 wherein said inlet tube is vertically disposed.

* * * * *